J. G. PERRY.
Meat Cutter.

No. 43,428.  Patented July 5, 1864.

WITNESSES
Benjamin Arnold
John E. Perry

INVENTOR
John G. Perry

UNITED STATES PATENT OFFICE.

JOHN G. PERRY, OF SOUTH KINGSTON, RHODE ISLAND.

IMPROVED MEAT-CUTTER.

Specification forming part of Letters Patent No. 43,428, dated July 5, 1864.

*To all whom it may concern:*

Be it known that I, JOHN G. PERRY, of South Kingston, in the county of Washington, in the State of Rhode Island, have invented new and useful Improvements in Machines for Cutting Meat, &c.; and I do hereby declare that the following is a full and correct description thereof, reference being had to the accompanying drawings, and to the letters of reference marked thereon, the same letters denoting similar parts in all the figures.

Figure 1:
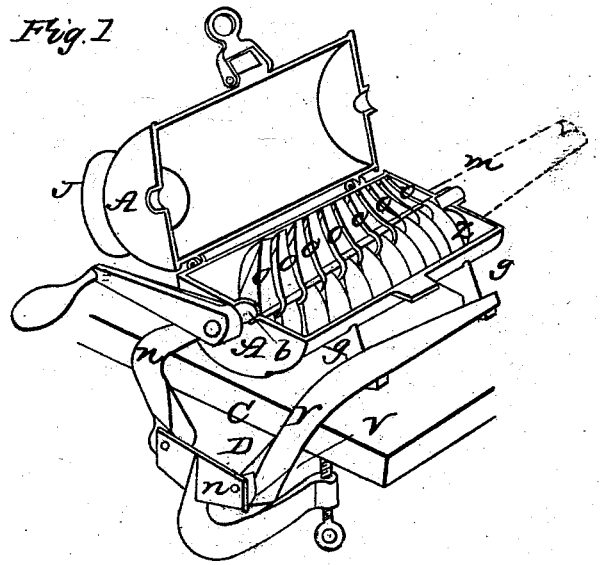
Figure 2:
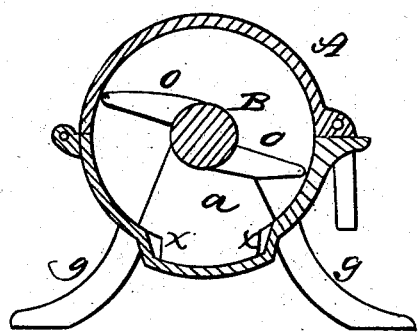
Figure 3:
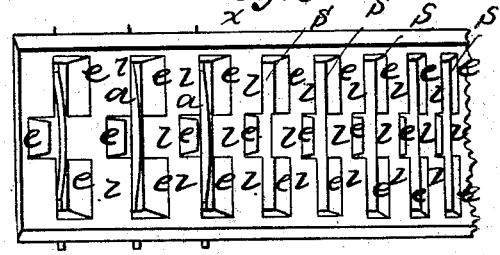

Figure 1 shows a perspective view of the meat cutter open. Fig. 2 is a cross-section through the middle of the cutter. Fig. 3 is a view of the device for holding the knives, taken from the under side, and showing but part of the plate and of full size.

The mode of constructing my meat-cutter is as follows: Make a cylindrical case, A, divided into an upper and lower part, which are secured together by hinges upon the back and a catch in front. Bearings are made in each end of the case to hold the journals of the shaft B, which shaft has rows of figures or studs, $o$, projecting from it that are set in a spiral position and so as to correspond in distances apart with the knives in the bottom of the case. The plate $x$, which holds the knives $a\ a$, is made with recesses S S, one for each knife, cast in the plate; and to make the molding of them practicable and easy alternate portions of the sides of the recesses are beveled away, $e\ e$, and other alternate portions, $l\ l$, are left full and square to hold the knives. (See Fig. 3, which shows a portion of the plate with some of the knives $a\ a$ in place.) This plan of making the plate to hold the knives has important advantages over the two ways in which it has formerly been done, one of which was putting the knives into the mold and casting the metal onto their shanks, the great disadvantage of which was that the knives could not be removed singly for the purpose of sharpening or replacing them when broken. Another was to cut the recesses in the plate, which has the objection of being too expensive. Both of which objections are obviated in my plan for casting the recesses in the plate. The case of the cutter is provided with legs $g\ g$, which are secured to the table $c$, while the machine is in use, by means of the clamp D, the arms $r\ r$ of which are movable on the body-piece $n$, being fastened to it by pivots to allow of turning, so as to open and accommodate themselves to the different widths of legs of different-sized machines.

To use the machine, first place it on the table or shelf near the edge, and having opened the arms of the clamp slide them on over the lower parts of the legs, bringing the lower part of the clamp under the table with the screw $v$, which, being turned up against the table, will draw the adjustable arms together and down on the feet of the machine, pressing them firmly to the table, when the pieces of meat being put into the hopper J, and the crank turned, the studs or fingers $o\ o$ will carry them down against the knives, which are placed so as to cut close to one side of the studs and shear the meat off easily, until by being carried around and through the knives a sufficient number of times it is cut small enough, and having by this time been passed along the case, by action of the spiral rows of studs, to the discharging-aperture $z$, it is thrown out. The advantages of this mode of fastening the machine over the usual manner of screwing down the feet will be readily seen, as well as the facility with which it can be attached to a table or shelf without the trouble of finding screws, gimlet, and screw-driver, which are often mislaid or lost. It is also very readily taken off when desired for washing, &c.

The dotted line $m$ represents a tube or nozzle by the use of which the meat may be filled directly into the cases as fast as it is cut.

Having described the construction and operation of the cutter, what I claim as my invention is—

1. Making the plate to hold the knives $x$, Fig. 3, with recesses S S, having alternate projections $l\ l\ l$ and vacancies $e\ e\ e$ on their sides, substantially as described, and for the purposes set forth.

2. The arrangement of parts, substantially as herein described, for the purpose of holding the machine in place, as herein set forth.

JOHN G. PERRY.

Witnesses:
BENJAMIN ARNOLD,
JOHN E. PERRY.